United States Patent [19]
Grady et al.

[11] 3,892,967
[45] July 1, 1975

[54] APPARATUS FOR RADIOLOGICAL EXAMINATION OF A SUBJECT THROUGH A SOLID ANGLE

[75] Inventors: John K. Grady, Lincoln; David B. Rice, Cambridge, both of Mass.

[73] Assignees: John K. Grady, Lincoln, Mass.

[22] Filed: Dec. 10, 1973

[21] Appl. No.: 423,449

[52] U.S. Cl. ............... 250/447; 250/226; 250/578; 250/490; 248/123
[51] Int. Cl. .... G01n 21/26; G01j 3/34; G03b 41/16
[58] Field of Search .................... 250/226, 343, 578; 250/444, 445, 447, 454, 490; 248/123

[56] References Cited
UNITED STATES PATENTS

| | | | |
|---|---|---|---|
| 3,177,757 | 4/1965 | Polanyi | 250/226 X |
| 3,803,417 | 4/1974 | Kok | 250/447 |

*Primary Examiner*—Eli Lieberman
*Attorney, Agent, or Firm*—Flehr, Hohbach, Test, Albritton & Herbert; James H. Grover

[57] ABSTRACT

A framework supporting a radiation source, such as an x-ray tube, and a radiation receptor, such as an x-ray film plate holder, comprises four arms pivotally connected to form a regular parallelogram, a parallel pair of the arms extending outside the parallelogram to pivot points for the radiation source and receptor. The parallelogram is mounted on a rotor whose central axis is parallel to the parallel pair of arms. Two links between another one of the arms and the source and receptor respectively, and parallel to the central axis, hold the axis of the source and receptor aligned on a radiation axis which passes through an isocenter on the central axis as the parallelogram is angularly adjusted in planes parallel to the central axis. The angular adjustment of the parallelogram combined with turning of the parallelogram on the rotor permit the source to radiate through a subject at the isocenter, for example the human heart or brain, from throughout a solid angle while maintaining constant radiological distance between the source and subject and a constant axial alignment of the source and receptor. The radiological magnification may also be kept constant, or the receptor may be adjusted along its axis, in which case a counterweight reciprocating along the transverse arm and connected to the receptor by two cables counterbalances the receptor in all solid angle positions.

9 Claims, 3 Drawing Figures

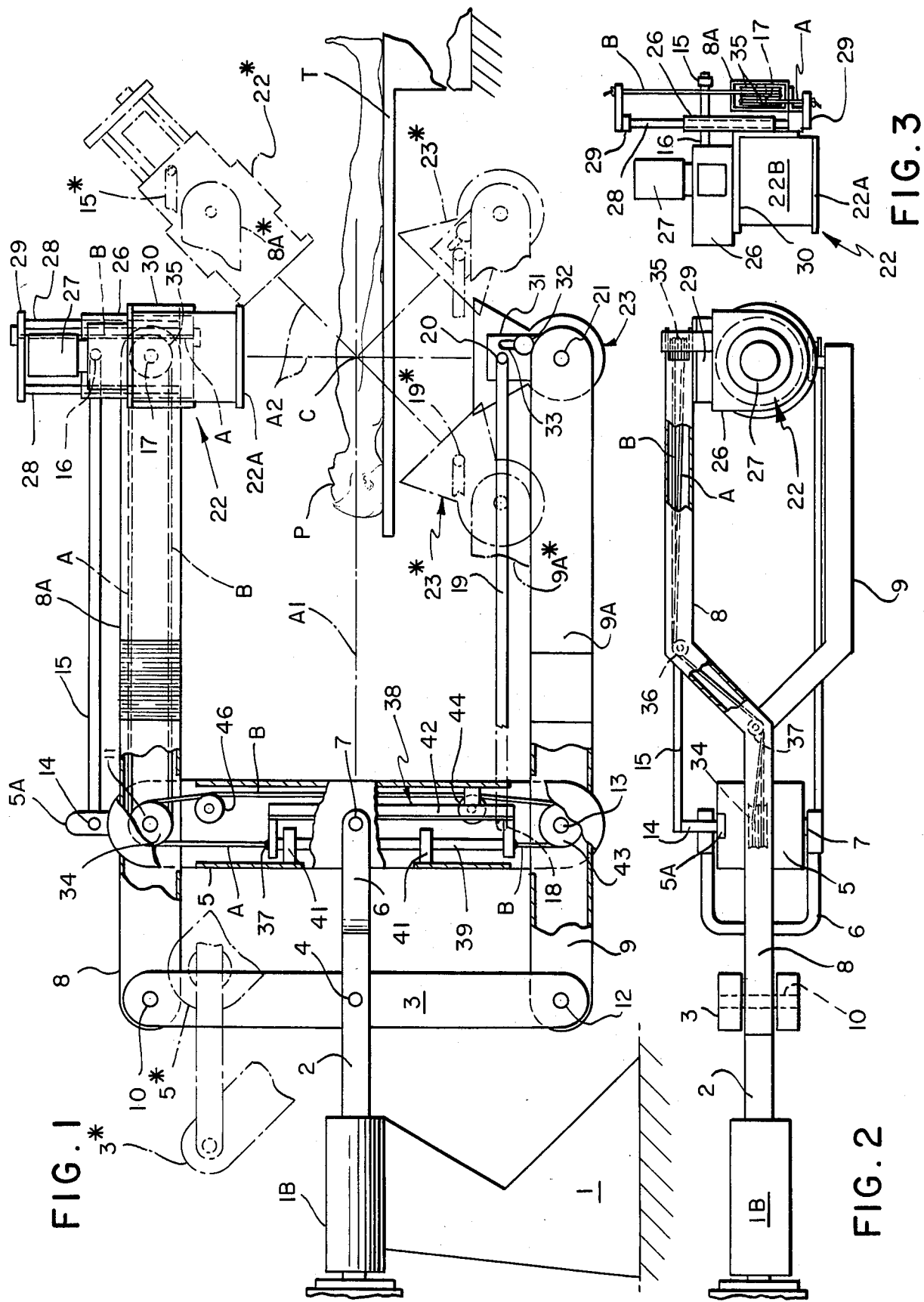

APPARATUS FOR RADIOLOGICAL EXAMINATION OF A SUBJECT THROUGH A SOLID ANGLE

BACKGROUND OF THE INVENTION

In older apparatus for examining a patient or other subject with penetrating radiation from an x-ray tube or a radioactive element, the radiation source and a film plate or other receptor are located on a fixed axis and the subject must be moved to allow radiological examination at different angles through the subject. More modern radiological apparatus allows the subject to remain fixed while the radiation beam is inclined through different angular paths toward the subject. In U.S. Pat. No. 2,167,116 issued to J. Kieffer July 25, 1939 the x-ray tube is mounted on a parallelogram framework which moves the tube through various angular positions with respect to the plane of a film holder, which plane is parallel to a fixed plane. Such apparatus is suitable for tomography in which a single film is exposed continuously from various angles, but the variation in the x-ray beam incidence on the fixed plane of the film necessarily produces a variation in distance from the x-ray source to different parts of the film other than its center causing portions of the subject outside a selected plane through the subject parallel to the film to be distorted by different magnifications and radiation intensities.

The radiation source axis may be considered as the central ray of the cone-shaped x-ray beam analogously to an optical axis, while the radiation receptor axis is a line normal or perpendicular to the center of the plane of a film holder, of a fluoroscopic screen or image intensifier screen, or the entrance to a scintillation counter device. When the two axes are not coincident on a common radiation axis normal to the film or other receptor plane they are misaligned and the above described variation in radiological distance to the subject arises. The distance variation also arises with aligned source and receptor axes as in U.S. Pat. No. 2,818,510 issued to H. Verse, Dec. 31, 1957, wherein two sliding arms support an x-ray tube and fluoroscope equally distant from an axis of rotation. Coupling rods connected by a link hold the axis of the tube and a fluoroscope aligned as they are adjusted at various angles with respect to a point on the rotational axis, but the distance from the tube or scope to the axial point increases as the angle increases, thereby producing a variation in radiation intensity at the point, and in the diameter of the x-ray beam and in intensity of the image on the fluoroscope during angular movement.

While the above variations in radiation distance and intensity are tolerable in tomography, such variations and additional variations in magnification prevent use of the apparatus in neuro or cardiac angiography in which a fixed organ of a patient is repeatedly exposed to radiation at different inclinations through a solid angle as a succession of radiological images are viewed or recorded without geometric distortion throughout its depth. In angiography it is essential not only that the axes of the radiation source and receptor remain aligned during angular movement so that the radiation beam strikes the receptor at a constant angle, i.e. normal or perpendicular, but also that the distance from the subject to the radiation source, and to the receptor and the radiation intensity remains constant during angulation.

Accordingly one object of the present invention is to provide radiological apparatus which permits scanning a subject with penetrating radiation from various angles throughout a solid angle while maintaining the source of radiation and the radiation receptor aligned on a radiation axis common to their respective axes, and which also maintains the radiation source and the receptor at a constant distance from the subject. A further object is to maintain the receptor in balance with the rest of the apparatus even when the receptor is adjusted toward or away from the subject. Other objects are described hereinafter.

SUMMARY OF THE INVENTION

According to the invention radiological apparatus for examination of a subject comprises a main support rotor mounted to turn about a central axis; four pivotally connected members of fixed length forming an angularly adjustable parallelogram, two of the members being pivotally attached transversely of the rotor at locations spaced along the central axis, the other two members having extensions parallel to the central axis beyond the parallelogram; radiation source means having an axis and attached by a pivot on one extension; radiation receptor means having an axis and attached by a pivot on the other extension; first and second links respectively mechanically connected at one end to one transverse member and at the other end to a point spaced from the pivot of one radiation means so as to hold the axes of both radiation means aligned on a common radiation axis through an isocenter on the central axis, the links being parallel to the central axis and operative to hold at least one radiation means at a fixed distance from the isocenter as adjustment of the rotor and parallelogram inclines the radiation axis through a solid angle about the isocenter, whereby a fixed subject at the isocenter may be radiologically examined at constant radiological distance and axial alignment from throughout the solid angle.

DRAWING

FIG. 1 is a side elevation of radiological apparatus according to the invention;

FIG. 2 is a plan view of the apparatus;

FIG. 3 is an end elevation of the radiation receptor portion of the apparatus.

DESCRIPTION

Shown in the figures is apparatus for x-ray examination of a patient P in a fixed position on a radiation-transparent table T. The patient is shown in FIG. 1 with his heart located at an isocenter C which is at the intersection of an axis of rotation A1 of the apparatus and of a radiation axis A2 between an x-ray tube 23 and a radiation image intensifier 22. Subjects other than a human organ may be examined by other sources 23 of penetrating radiation such as radioactive materials, and the radiation receptor 22 may be a ray-sensitive film, fluorescent screen or a scintillation counter. In each case it is desired that the subject be at the isocenter C on the radiation axis A2 which is coincident with the aligned axes of the x-ray tube 23 and the image receptor 22. In neuro and cardiac angiography the human organ is examined radiologically by tilting or angulating the x-ray tube 23 and image receptor 22 through 360° of angle around the central axis A1 of the system which is around the longitudinal axis of the patient, and also through 90° of angle, for example, in the head to foot direction, that is about a secondary axis perpendicular to the central axis A1 and through the isocenter C. Angulation of the radiation axis A2 about the isocenter is thus possible through a solid angle defined by the 360° angulation about the central axis A1 and the head to foot tilting of the radiation axis.

The apparatus producing such angulation comprises a heavy base 1 anchored to the floor of a hospital or laboratory, the base having a rotary bearing 1B for a central rotor shaft 2 journalled in the bearing. A first transverse member 3 extending generally vertically of the rotor 2 is pivotally attached to the rotor at 4. A second transverse member is pivotally supported at 7 in a yoke 6 on the right end of the rotor 2. The two transverse members 3 and 5 and two other members, upper and lower arm 8 and 9, are pivotally connected by bearing pins 10, 11, 12 and 13 to form an angularly adjustable parallelogram (3,5,8,9) whose sides are of a fixed length between the pivotal connections (10,11,12,13). (This is in contrast to the apparatus of the previously mentioned U.S. Pat. No. 2,818,510 to Verse wherein a sliding pivot varies the effective length of a transverse member).

The two other horizontal members 8 and 9 have extensions 8A and 9A outside the parallelogram for distances sufficient to allow the table T and patient P to be located close to the vertical transverse member 5. At the free ends of the extensions 8A and 9A are two pivots 17 and 21 respectively for the image intensifier 22 and the x-ray tube 23. The pivot points 10,11 and 17 are in a straight line parallel to the central axis A1, and spaced the same distance from the central axis as a line through pivot points 12,13 and 21, which are also parallel to the central axis. A short extension 5A from the transverse member 5 has a pivot point 14 for a link 15 extending to a pivot point 16 on the image intensifier assembly 22. Similarly a second link 19 is connected between a pivot point 18 on the transverse member 5 and a point 20 on the x-ray tube 23. The distances between points 16 and 17, and between points 11 and 14 are equal; the distances between points 13 and 18, and between points 20 and 21 are equal. Similarly the distances between the following points are equal: 14 and 16, 11 and 17, 18 and 20, 13 and 21; 10 and 11, 4 and 7, 12 and 13; 4 and 10, 7 and 11; 4 and 12, 7 and 13.

Typically the x-ray tube 23 is held by the pivots 20 and 21 at a fixed distance from the isocenter C on the central axis A1. However, the two pivots 20 and 21 may be connected to a plate 31, the x-ray tube 23 being slidingly attached to the plate 31 by a thumb screw 32 adjustable in a slot 33 through the plate 31 allowing the tube to be adjusted along its axis which is coincident with the radiation axis A2.

The image intensifier assembly 22 comprises a fluorescent imaging plate 22A which in a known way excites image intensifier stages 22B so as to produce an optical image of greater brightness. This intensified image enters a beam splitting image distributor 26 of known design, which transmits at least one image along to an image recorder such as a television camera 27. The camera 27, distributor 26, intensifier 22 B and fluorescent receptor screen 22A are on an axis of the image intensifier 22 as a whole, which axis is coincident with the radiation axis A2.

As shown in FIGS. 2 and 3 the image intensifier assembly is attached by a bracket 30 to the lower of two plates 29. Between the plates 29 are two vertical bearing rods or rails 28 which slide in a bearing block 26 attached to the upper horizontal extension 8A. The sliding support of the rails 28 in the bearing block 26 allows the image intensifier assembly 22 to be slidingly adjusted along its axis.

Within the upper extension 8A is a double pulley 35 having two sheaves which are journalled at the pivot point 17. A first flexible cable A anchored at one end to the lower rail supporting plate 29 extends over one sheave of the double pulley 35, thence extends through the upper extension 8A around double pulleys 36 and 37 journalled between the walls of the extension 8A to a double pulley 34 journalled at the pivot point 11 at the top of the transverse member 5 (FIG. 2). As shown in FIG. 1, after passing over the pulley 34 the cable A extends to an anchor point 37 at the top of a counterweight assembly 38 hanging inside the transverse member 5. The counterweight assembly 38 includes a vertical rod 39 sliding in guides 41 attached inside the transverse member 5 and a heavy weight 42 extending parallel to the rod 39. Anchored at the bottom of the counterweight assembly 38 is a second cable B which leads around a pulley 43 journalled in the transverse member 5A at pivot point 13. The cable B then extends around two idler pulleys 44 and 46 to the previously mentioned double pulley 34 at the top of the transverse member 5. The cable B is wound around one sheave of the double pulley 34, thence over double pulleys 37, 36 and 35, and as shown in FIG. 3 from double pulley 35 to the top rail support plate 29 where cable A is anchored. The counterweight 42 at one end of both cables is selected so as to counter balance the weight of the image intensifier assembly 22, which typically is in the order of 200 lbs. and adjustment of which would otherwise upset the balance of the parallelogram system.

For certain angiographic examinations of a subject it is desirable to adjust the whole system through different positions, including the parallelogram, its extensions, the x-ray tube and image intensifier manually. An imbalance of 200 lbs. would render manual adjustment of the system impossible. However, with the present system the image intensifier assembly may be adjusted axially toward or away from the isocenter C at the patient's organ without upsetting the balance of the system by virtue of the fact that the connection of cables A and B between the image intensifier assembly 22 and the counterweight assembly 38 adjusts the position of the counterweight with respect to the axis of rotation so as to exactly compensate for any adjustment of the image intensifier. Moreover, since the center of gravity of the counterweight assembly 38 travels on a line intersecting the central axis A1, the counter balancing effect remains equal and opposite to that of the image intensifier assembly at all angles throughout the 360° revolution of the parallelogram system around the central axis A1.

Further according to the present invention the coordinated effect of the fixed-sided parallelogram support system for the radiation source 23 and receptor 22 and the links 8 and 9 make it possible to scan the radiation axis throughout a solid angle to the subject at the isocenter C while maintaining constant intensity of radiation on the subject at the isocenter, constant distance from the radiation source to the subject, and constant magnification of the image of the subject.

As shown in FIG. 1, as the x-ray tube 23 and image intensifier 22 on the parallelogram 3,5,8,9 are adjusted from the solid line position to angular positions 23* and 22* their respective pivots 21 and 17 describe a circular arc around the isocenter C. This circular movement combined with turning of the rotor 2 causes the pivot points and the x-ray tube and image intensifier plate 22A to move on spherical surfaces. If the center of radiation of the x-ray tube 23 is at its pivot 21 as shown and the center of the intensifier plate 22A is adjusted to be on the axis of the pivot 17 the two spherical surfaces are coincident. In either case the lower and upper links 19 and 15 to the x-ray tube 23 and image intensifier 22 cause the axes of these two radiation means 23 and 22 to remain superimposed or coincident on the radiation axis A2 with the central x-ray directed at the center of the image intensifier plate 22A and incident on the center of the plate at a right angle, i.e. normal, to the plate. In maintaining this aligned relation of radiation means axes the links 8 and 9 incline the x-ray source 23 and image receptor 22 during circular movement of the pivots 17 and 21 and maintain the constant distance from the source 23 to the subject at the isocenter C and to the receptor 22. Maintenance of this constant distance together with axial alignment insures that radiation intensity at the subject and receptor will remain constant throughout the width of the conical x-ray beam and across the whole area of the receptor plate 22A. Consequently the present apparatus, in contrast to prior systems, will allow radiological examination effectively viewing different planes through a subject at the isocenter while holding the image size constant because the image receptor is always perpendicular to and aligned with the radiation axis.

In operation then, a doctor may, in cardiac angiography view the heart from different angles without change in size of the heart image as the angle is changed, for example while following the progress of a catheter through the arteries. Because of the precise counter balancing previously described the doctor may manually make small angular adjustments precisely to the desired viewing angle. After injection of a radiopaque dye through the catheter, the doctor may then make a series of exposures of the heart from various angles throughout a solid angle without moving the patient by using both the rotary adjustment around the central axis A1 through the heart at the isocenter C and the head to foot parallelogram adjustment.

The image distortion due to variations in radiation distance or alignment of prior apparatus prevented satisfactorily making a series of exposure records. But in the present apparatus, for example, a succession series of exposures at different solid angles may be made on a series of film plates or camera frames for subsequent optical or electronic analysis; or a scintillation counter can be used to scan a series of images of different angular views through the subject, and the scanning data can then be processed prior to producing a composite record of the series of images. These radiological examination procedures are made possible by the constant radiation distance and alignment of the present apparatus, and are facilitated by the counter balancing arrangement.

It should be understood that the present disclosure is for the purpose of illustration only and that this invention includes all modifications and equivalents which fall within the scope of the appended claims.

We claim:

1. Radiological apparatus for examination of a fixed subject comprising:

a main support rotor mounted to turn about a central axis;

four pivotally connected members of fixed length forming an angularly adjustable parallelogram, two of the members being pivotally attached transversely of the rotor at locations spaced along the central axis, the other two members having extensions parallel to the central axis beyond the parallelogram;

radiation source means having an axis and attached by a pivot on one extension;

radiation receptor means having an axis and attached by a pivot on the other extension;

first and second links respectively mechanically connected at one end to one transverse member and at the other end to a point spaced from the pivot of one radiation means so as to hold the axes of both radiation means aligned on a common radiation axis through an isocenter on the central axis, the links being parallel to the central axis and operative to hold at least one radiation means at a fixed distance from the isocenter as adjustment of the rotor and parallelogram inclines the radiation axis through a solid angle about the isocenter, whereby a fixed subject at the isocenter may be radiologically examined at constant radiological distance and axial alignment from throughout the solid angle.

2. Apparatus according to claim 1 including means mounting at least one of said radiation means for sliding adjustment on its axis, a counterweight slidingly mounted on one of said transverse members, and coupling means connecting the radiation means and counterweight so as to produce substantially equal and opposite movement of the counterweight with respect to the central axis when the radiation means is adjusted.

3. Apparatus according to claim 2 wherein the counterweight is distributed on both sides of the central axis.

4. Apparatus according to claim 2 wherein the coupling means comprises cable means guided by a pulley at the pivot of the radiation means.

5. Apparatus according to claim 4 wherein the cable means is further guided by a pulley at the pivotal connection of the transverse member.

6. Apparatus according to claim 2 wherein the said transverse member is hollow and the counterweight is mounted inside the transverse member.

7. Apparatus according to claim 2 wherein the cable means comprises two cables each connected at one end to one of the two opposite ends of the counterweight and at the other cable end to one of the two opposite ends of the sliding mounting means.

8. Apparatus according to claim 1 wherein the links are parallel to and equidistant from the central axis.

9. Apparatus according to claim 1 wherein the aforesaid other two members extend parallel to and equidistant from the central axis.

* * * * *